United States Patent [19]
Warner

[11] 3,819,030
[45] June 25, 1974

[54] CONVEYOR APPARATUS
[75] Inventor: Kent F. Warner, White Plains, N.Y.
[73] Assignee: W & H Conveyor Systems, Inc., Carlstadt, N.J.
[22] Filed: Sept. 18, 1972
[21] Appl. No.: 289,937

[52] U.S. Cl................. 198/165, 198/162, 198/194
[51] Int. Cl.............................................. B65g 15/14
[58] Field of Search ........... 198/162, 165, 181, 182, 198/189, 194

[56] References Cited
UNITED STATES PATENTS
3,100,565  8/1963  Fry...................................... 198/182
3,269,525  8/1966  Paulski................................ 198/189
3,603,448  9/1971  Okano et al......................... 198/162
3,690,444  9/1972  Chassang............................ 198/165

*Primary Examiner*—Evon C. Blunk
*Assistant Examiner*—Joseph E. Valenza
*Attorney, Agent, or Firm*—Thomas B. Graham

[57] ABSTRACT

A conveyor apparatus includes a conveyor mechanism, a movable conveyor belt for carrying articles thereon along a path, a plurality of elastic cords, with cover, and means connecting the cords to the conveyor mechanism spacedly transverse to the path whereby the elastic cords stretch over the articles and hold them securely in their position on the moving belt as the belt traverses sharp inclines or vertical rises.

2 Claims, 5 Drawing Figures

PATENTED JUN 25 1974  3,819,030

PATENTED JUN 25 1974 3,819,030

CONVEYOR APPARATUS

DESCRIPTION OF THE INVENTION

This invention relates to conveyor apparatus in general and, in particular, to conveyor apparatus of the type suited to move articles of the type such as luggage, boxes and the like.

Generally known conveyors of the type suited for moving the articles of this type usually include an endless belt driven by a motor. The articles are transferred by placing them on the moving belt which carries them along a path on level ground with little or no incline. While this type of conveyor apparatus is suitable for transferring the articles on a relatively level plane, it is not capable of doing so along relatively sharp inclines or vertical rises because the articles slide or fall by force of gravity. It is also not well suited to move the articles at a relatively high speed because the articles slide or fall at the high speed and are likely to be thrown off their places by their momentum.

A principal object of the present invention is to provide a conveyor apparatus capable of moving articles of the type such as luggage along sharp inclines or vertical rises while holding the articles securely in their positions during their transit.

Another object is to provide a conveyor apparatus which is capable of transferring articles securely in their positions at relatively high speeds.

These and other objects and various features of the present invention will become clearer from the following detailed description of an illustrative embodiment thereof in conjunction with accompanying drawings, in which.

DETAILED DESCRIPTION OF THE INVENTION

Figure 1:
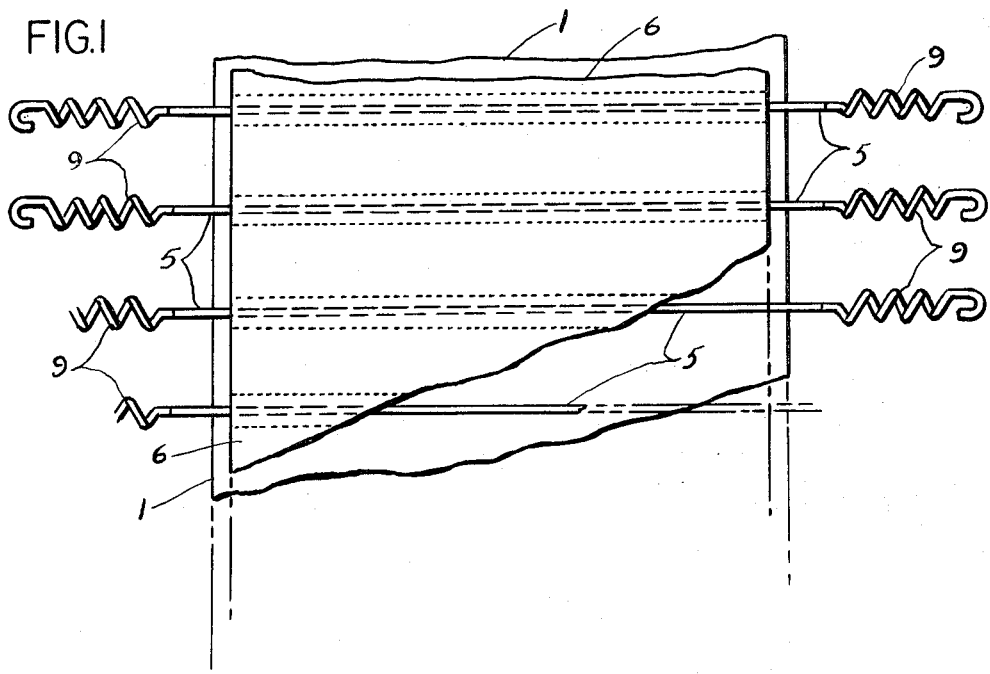
FIG. 1 is a planar view of a conveyor belt and a plurality of elastic cords of the conveyor apparatus in their relative positions in their envelopes.

The conveyor apparatus of the present invention is of a design that holds articles of the type such as luggage or boxes securely in their positions on a conveyor belt that moves along a path of a sharp incline or vertical rise. Referring to the drawings, the conveyor apparatus includes a belt 1 that may be driven by a motor (not shown) in a conventional manner, and that may include a slider bed 3 (FIG. 2) of a suitable material such as steel having a smooth surface which supports the belt 1 so that the belt can ride on it as it carries articles.

Figure 2:
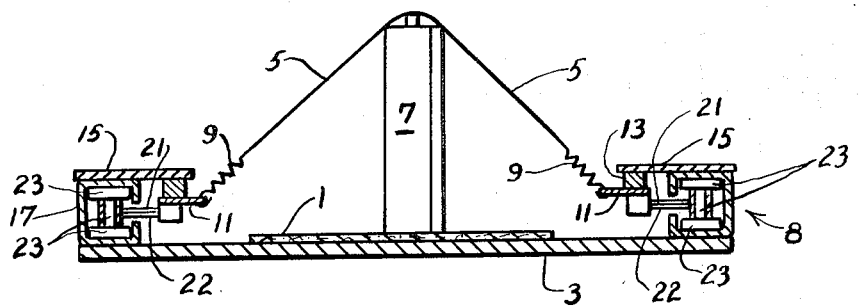
FIG. 2 is a side view of a cross section of the conveyor apparatus showing an elastic cord stretching over a piece of luggage and holding it in position.

As illustrated in FIGS. 1 and 2, according to an aspect of the present apparatus, it is provided with a plurality of elastic shock cords 5 for holding the articles 7 in place. The elastic shock cords are made of suitable material such as rubber or equivalent which are elastic, flexible and durable and enclosed in envelopes and sewn into cloth or canvas covers. The shock cords are connected to the moving conveyor mechanism 8 of a suitable conventional design and spaced at suitable intervals, substantially transverse to the moving path of the moving belt 1, as generally illustrated in FIGS. 1 and 2, so that at least several of them will pass and stretch over a package and hold it in place. The restraining action of the cloth holds the cords from slipping to one side or the other of the article.

Figure 3:
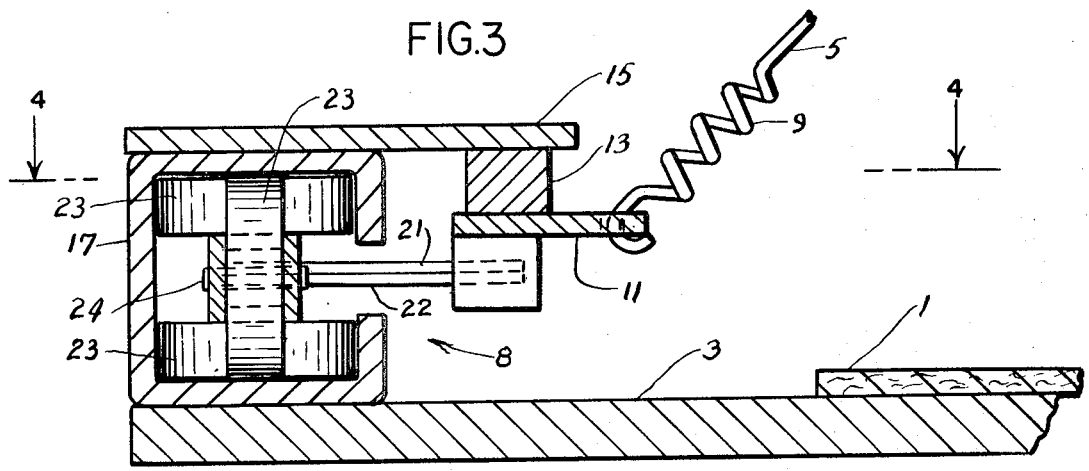
FIG. 3 is an enlarged side view of one side of the conveyor apparatus showing a cross section of a universal link chain, a guide rail, an angle joint connecting an end of an elastic cord to the link, a bearing and a thrust plate positioned to hold the bearing on which the angle joint rides.
Figure 4:
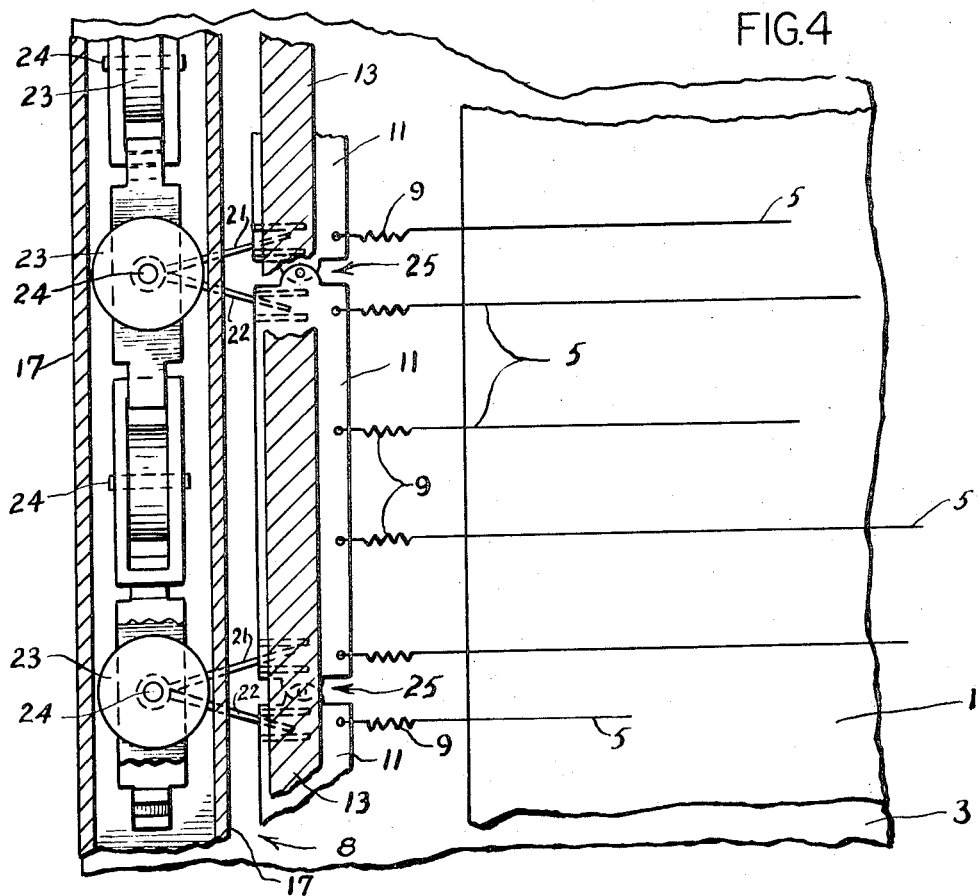
FIG. 4 is a planar view showing a pair of rollers of the link, the guide rail, the bearing and the angle joint along A—A of FIG. 3.

Referring to FIGS. 2, 3, and 4, each end of the flexible cord is connected to the driven part of the conveyor mechanism 8 by a spring type of coil fitting 9 which hooks onto an angle joint 11. The angle join 11 is positioned relative to a bearing 13, which is in the form of an elongated block of teflon or nylon or micarta or the like material attached to a thrust plate 15. The bearing 13 takes up the upward thrust exerted by the flexible shock cords as they stretch over the package 7. The bearing 13 is mounted under the thrust plate 15 which is attached to the guide track or rail 17 of conventional design. As illustrated in FIGS. 3 and 4, generally, the conveyor mechanism may include a universal link chain of the type having a plurality of rollers 23 connected in series in a chain, the rollers being linked so that their axes of rotation are more or less 90° phase shifted with respect to each other in succession but transverse to the direction of the guide track 17. Typically, successive rollers are linked rather loosely so that the chain link formed by the rollers follows the bends and inclines of the track freely. This portion of the structure is conventional and illustrated in the catalogue of Jervis B. Webb Company Unibilt Overhead Division, e.g., Unibilt Overhead Universal Link Chain No. 8664.

As illustrated in FIGS. 3 and 4, the angle joint may be an elongated L-shaped plate of a length somewhat shorter than the space between adjacent vertically positioned rollers 23. The two ends of the angle plate 11 are connected securely to the two adjacent rollers 23 by links or arms 21 and 22 in a suitable manner. Successive angle joints are spaced by an element 25 of a suitable design which intercouples loosely successive the angle plate or joint back to back allowing relative freedom of movement of adjacent plates.

Figure 5:
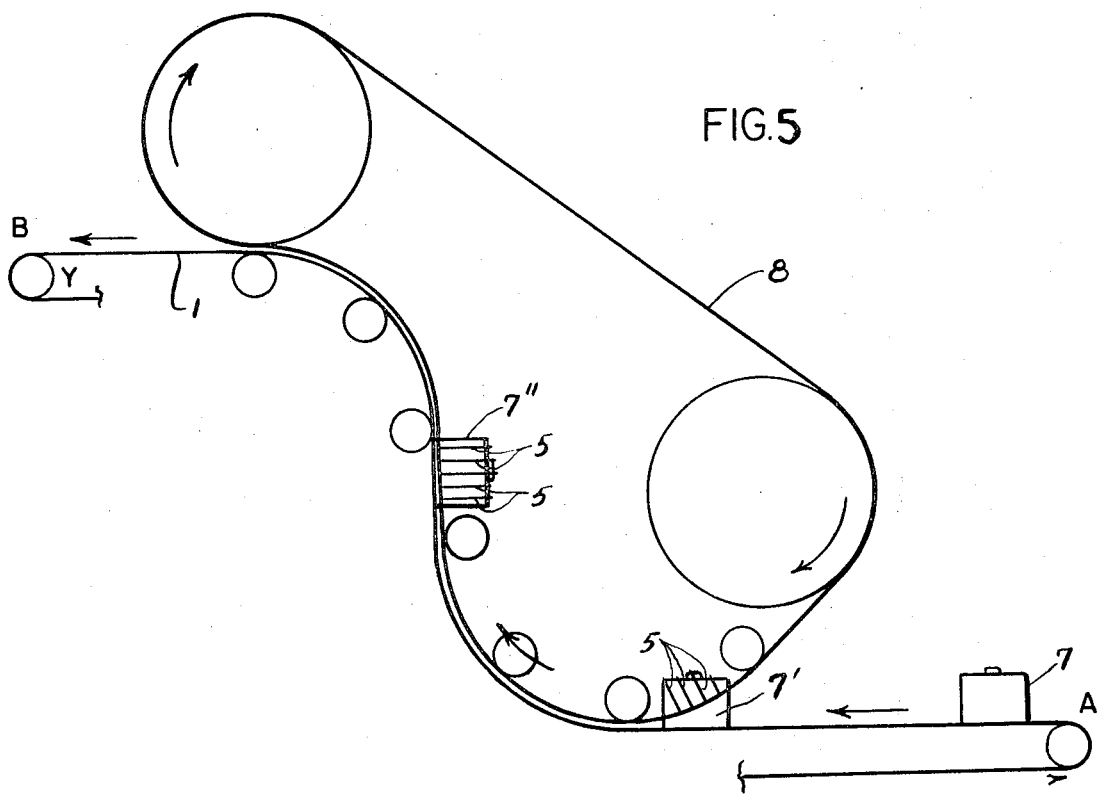
FIG. 5 is a schematic drawing of a layout of the conveyor apparatus in moving articles such as luggage from a plane to a higher plane over a vertically rising conveyor belt.

FIG. 5 illustrates a conveyor apparatus set up to move articles from a lower plane A to a higher plane B over a path which rises substantially vertically. The articles can be securely moved to the higher plane by using the elastic shock cords in a number of ways. One way is to set up the conveyor belt 1 in a lopp between two points X and Y on the two planes A and B, wherein the belt extends out some distance away from the incline at the upper and lower planes, as shown.

The guide track 8 is set up in a suitable path as shown in FIG. 5 so that the elastic shock cords 5 are driven at the same speed as the belt in the same direction at the incline. As the cords moving along the guide track approach the moving belt at about its foothill near the lower bend of the vertical rise, they stretch over the articles and hold them against the moving belt in their positions until the articles reach the higher plane and move away from the cords toward Y. In this manner, any number of the elastic shock cords 5 may be used to stretch over the article 7 as it approaches the foothill of the incline, hold it securely on the moving belt until after the article is carried away to the higher plane B.

Thus, in accordance with an aspect of the present invention, thrust plates bearings in the form of sliding blocks, and angle joints are used as described above to connect the elastic cords to the conventional roller chain links so as to make the cords move and stretch over the articles and hold them securely on to a moving belt as the latter carries the articles over sharp inclines or vertical rises.

Various other modifications and changes may be made to the conveyor apparatus of the present invention described above without departing from the spirit and scope thereof, as set forth in the following claims.

What is claimed is:

1. In a conveyor apparatus of the type suited for use in transferring articles of the type such as luggage and boxes on a moving conveyor belt from one plane to a higher plane over a sharp incline or when a vertical rise, having a driven conveyor belt riding on a sliding surface and forming a path from said one plane to said other plane over said sharp incline or said vertical rise,
   a pair of guide tracks,
   a conveyor mechanism having pairs of links disposed one on each side along at least a portion of the two sides of said conveyor belt,
   means for driving said pair of movable links along said path,
   a plurality of elastic cords,
   means connecting said plurality of elastic cords to said pair of links so that said plurality of elastic cords are spacedly positioned substantially transverse to the conveyor path,
   a pair of parallel guide tracks disposed to guide said pairs of links,
   whereby one or more of said elastic cores are stretchable over each of the articles to hold them securely in their positions on the conveyor belt as driven over sharp incline or vertical rise,
   each of said pairs of links being of a universal link type having a plurality of rollers linked in series, said apparatus including said pair of stationary guide tracks for guiding said pairs of links respectively therealong, thrust plates positioned to extend over said tracks toward the moving belt, bearing blocks affixed to said thrust plates, and angle joints connecting the ends of said cords to said links and positioned to slide over said bearing blocks,
   wherein said guide tracks are positioned to follow a path so that a portion thereof along said sharp incline or said vertical rise approaches and parallels the conveyor belt, whereby said cords stretch over said articles riding on the conveyor belt, as said articles approach,
   the beginning of the incline from said one plane, and hold them securely on said belt until said articles are moved onto said higher plane.

2. The apparatus according to claim 1, including thrust plates positioned on each of said guide tracks, angle joints for connecting the rollers of said universal links to the ends of said elastic cords, bearing blocks interposed between said angle joints and said thrust plates for providing sliding surfaces for said joints for taking up upward thrusts of said cords.

* * * * *